(12) United States Patent
Bei et al.

(10) Patent No.: US 11,364,772 B2
(45) Date of Patent: Jun. 21, 2022

(54) AIR CONDITIONING UNIT

(71) Applicant: Yiyan ZHANG, Zhejiang (CN)

(72) Inventors: Shihong Bei, Zhejiang (CN); Jianguo Zhu, Zhejiang (CN)

(73) Assignee: Yiyan Zhang, Zhejiang (CN)

( * ) Notice: Subject to any disclaimer, the term of this patent is extended or adjusted under 35 U.S.C. 154(b) by 393 days.

(21) Appl. No.: 16/494,638

(22) PCT Filed: Dec. 5, 2017

(86) PCT No.: PCT/IB2017/057627
§ 371 (c)(1),
(2) Date: Sep. 16, 2019

(87) PCT Pub. No.: WO2018/167550
PCT Pub. Date: Sep. 20, 2018

(65) Prior Publication Data
US 2020/0086717 A1    Mar. 19, 2020

(30) Foreign Application Priority Data

Mar. 17, 2017   (AU) ................................ 2017900944

(51) Int. Cl.
*B60H 1/32*     (2006.01)
*B60H 1/00*     (2006.01)
(Continued)

(52) U.S. Cl.
CPC ....... *B60H 1/3202* (2013.01); *B60H 1/00457* (2013.01); *B60H 1/00564* (2013.01);
(Continued)

(58) Field of Classification Search
CPC .............. B60H 1/3202; B60H 1/00457; B60H 1/00464; B60H 1/00471; B60H 1/00564;
(Continued)

(56) References Cited

U.S. PATENT DOCUMENTS 4,611,531 A     9/1986   Siegenia
5,791,156 A  *  8/1998   Strautman ............... F24F 13/22
                                                      62/244
(Continued)

FOREIGN PATENT DOCUMENTS

CN     105783123 A    7/2016
CN     105937500 A    9/2016
(Continued)

OTHER PUBLICATIONS

Office Action dated Sep. 18, 2019 in AU Application No. 2017403949.
(Continued)

*Primary Examiner* — Marc E Norman
(74) *Attorney, Agent, or Firm* — Muncy, Geissler, Olds & Lowe, P.C.

(57) ABSTRACT

An air conditioning unit, including: a chamber; a fan, in the chamber, for effecting an entry air entering the chamber and an exit air exiting the chamber; and an evaporative unit, in the chamber, for conditioning the entry air; wherein the fan, together with at least part of the chamber, creates a pressure zone, without ejecting air directly to, or without drawing air directly from, the evaporative unit, such that air moves through the evaporative unit substantially through a pressure effect.

12 Claims, 12 Drawing Sheets

(51) Int. Cl.
  *F04D 25/08* (2006.01)
  *F24F 5/00* (2006.01)
(52) U.S. Cl.
  CPC .. *B60H 2001/00235* (2013.01); *F04D 25/088* (2013.01); *F24F 5/0035* (2013.01)
(58) Field of Classification Search
  CPC .......... B60H 2001/00235; F24F 1/0018; F24F 1/0022; F24F 1/0029; F24F 1/0047; F24F 5/0035; F04D 25/088
  See application file for complete search history.

(56) References Cited

U.S. PATENT DOCUMENTS

| | | | |
|---|---|---|---|
| 6,358,139 | B1 | 3/2002 | Renz |
| 10,099,533 | B2* | 10/2018 | Mallek ............... B60H 1/00899 |
| 10,352,580 | B2* | 7/2019 | Kim ..................... F24F 1/0057 |
| 11,162,691 | B2* | 11/2021 | Nakamoto ............ F24F 1/0063 |
| 2011/0061414 | A1* | 3/2011 | McAllister, II ........ B60H 1/262 62/244 |
| 2012/0227932 | A1* | 9/2012 | Schaller ............. B60H 1/00542 165/42 |

FOREIGN PATENT DOCUMENTS

| | | |
|---|---|---|
| CN | 106369670 A | 2/2017 |
| CN | 106440068 A | 2/2017 |
| DE | 4115171 A1 | 11/1992 |
| DE | 102007031421 A1 | 1/2009 |
| EP | 1873461 A | 1/2008 |
| EP | 1890087 A1 | 2/2008 |
| KR | 20060117595 A | 11/2006 |
| KR | 20130006393 A | 1/2013 |
| WO | WO-2015/131235 A1 | 9/2015 |
| WO | WO-2016/016659 A1 | 2/2016 |

OTHER PUBLICATIONS

Office Action dated Mar. 26, 2020 in CN Application No. 201780034394.4. European Search Report dated Feb. 20, 2020 in EP Application No. 17900304.1.

* cited by examiner

AIR CONDITIONING UNIT

TECHNICAL FIELD

The present invention relates to a ceiling air conditioning unit, which can be installed in a building or on a vehicle.

BACKGROUND

It is common to include an air conditioning unit in a vehicle, such as a car, van, ute, truck, bus, motorhomes (RV), caravan, boat etc. The aim is to provide a cooling effect or heating effect when desired. An air conditioning unit normally includes a compressor, a condenser, a fan for the condenser, an evaporator (also known as evaporative unit), and a fan for the evaporator (also known as evaporator fan). The scientific principle of the working of an air conditioning unit is well known. For a ceiling air conditioning unit, part or the entire unit is mounted on top of a ceiling of a vehicle, for example, the condenser and compressor can be located elsewhere, away from the ceiling. Such a ceiling air conditioning unit can be used inside of a building. Sometimes, it is also known as a cassette air conditioner.

The noise generated by such unit or system is often at an unsatisfactory level, thus affecting or disturbing a person within a vehicle or a room. Embodiments disclosed herewith offer alternatives to those existing ceiling air conditioning units.

SUMMARY

According to an aspect of the present disclosure, there is provided an air conditioning unit, including: a chamber; a fan, in the chamber, for effecting an entry air entering the chamber and an exit air exiting the chamber; and an evaporative unit, in the chamber, for conditioning the entry air; wherein the fan, together with at least part of the chamber, creates a pressure zone, without ejecting air directly to, or without drawing air directly from, the evaporative unit, such that air moves through the evaporative unit substantially through a pressure effect. According to another aspect of the present disclosure, there is provided a vehicle with an air conditioning unit, the air conditioning unit, including: a chamber; a fan, in the chamber, for effecting an entry air entering the chamber and an exit air exiting the chamber; and an evaporative unit, in the chamber, for conditioning the entry air; wherein the fan, together with at least part of the chamber, creates a pressure zone, without ejecting air directly to, or without drawing air directly from, the evaporative unit, such that air moves through the evaporative unit substantially through a pressure effect.

In one form, the fan is an axial fan. In one form, the axial fan ejects air towards a wall of the chamber to create a positive pressure zone. In one form, the axial fan ejects the air upwards, then the air is guided to flow horizontally before redirecting downwards through the evaporative unit. In one form, the axial fan draws air away from a wall of the chamber to create a negative pressure zone.

In one form, the fan is a centrifugal fan. In one form, the air conditioning unit further includes a structure to collect water condensed on the evaporative unit. In one form, the air conditioning unit further includes one or more louvers to adjust the exit air.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
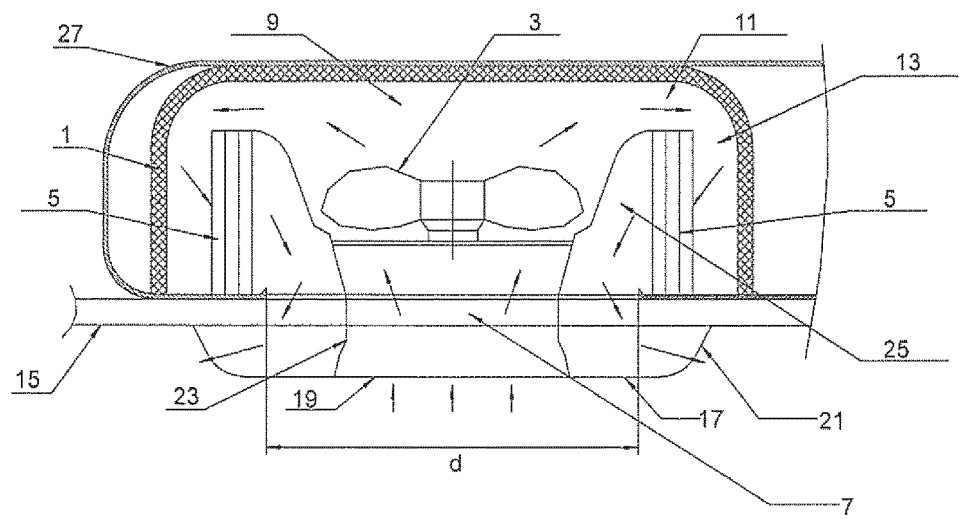
FIG. 1 depicts an embodiment where a fan creates a pressure zone, without ejecting air directly to, or without drawing air directly from, an evaporative unit, such that air moves through the evaporative unit substantially through a positive pressure effect.

Note that in this specification, unless stated otherwise, the orientation of an air conditioning unit is always with reference to the upright orientation when installed on a ceiling. The ceiling can be a room ceiling or a ceiling of a vehicle. For example, FIG. 1 shows an air conditioning unit installed on a ceiling at an upright position. The "d" in the figures represents an opening in the ceiling.

With reference to FIG. 1, there is provided an embodiment where the air conditioning unit as shown includes a chamber 1. Inside the chamber 1, there is an axial fan 3 and an evaporative unit 5. The axial fan 3 is positioned on top of an air input opening 7. In this embodiment, the evaporative unit 5 is, at least, at two sides of the axial fan 3. The evaporative unit 5 may also surround the axial fan 3. The evaporative unit 5 can include one or more independent evaporators (in the sense that each evaporator is powered separately). In one form, the evaporative unit is known as an evaporative coil. The evaporative unit can also be U (or n) shape. V shape, two U shapes, two V shapes, or combination of more than one "I" shapes.

As indicated in FIG. 1, there is no direct air from the axial fan 3 to the evaporative coil 5. Rather, there is provided a space 9 on top of the axial fan 3. From the space 9, there is one or more air flow path 11 leading to the evaporative unit 5.

In operation, the axial fan 3, when powered, draws air through the air input opening 7. The air will then be ejected upwards by the axial fan 3, towards the top wall of the chamber 1. In doing so, a high pressure zone is created in space 9. The high pressure zone in space 9 then forces the air to travel through one or more air flow path 11 to the evaporative unit 5. A zone before the evaporative unit 5 is also a high pressure zone, caused by the air travel through one or more air flow path 11 leading to the evaporative unit 5. This high pressure zone in space 13 before the evaporative coil 5 forces the air through the evaporative unit 5.

The evaporative unit 5 can be in many forms. In one form, the evaporative unit includes many fins. When connected to a compressor, and in operation, the fins provide the function of cooling or heating air passing through the evaporative unit 5. If the axial fan 5 is blowing directly at the evaporative unit 5, part of the air will be blown directly at certain obstacles, for example, the sides of the fins. This will generate noise as the air is not moving smoothly through the fins. In this embodiment, as it is depicted in the figure, the axial fan 3 does not eject air directly against the evaporative unit 5. Rather, the chamber 1 and the axial fan 3 creates a high pressure zone in space 9 that forces air to flow through one or more air flow path 11 leading to the evaporative unit 5. Since the zone in the space 13 before the evaporative unit 5 is also at a high pressure level, air is forced through the fins more evenly, thus reducing noise generated by the moving air. It also allows more distribution of air across the fins compared with ejecting air from a fan directly against the fins.

In one embodiment (not shown), the axial fan 3 can be replaced by more than one axial fan. In other embodiments, the axial fan 3 can be tilted at an angle (assuming that the orientation of the axial fan in FIG. 1 is at an angle of 0 degrees). In one embodiment, the angle can be 90 degrees with modification to the internal structure of the chamber as long as there is no ejection of air from the axial fan 3 to the evaporative unit 5 directly.

FIG. 1 also shows how the air conditioning unit is installed on a ceiling 15. Ceiling 15 can be the ceiling of a vehicle or a room or a corridor or any ceiling within a building. When installed, part of the air conditioning unit is below the ceiling and part of the air conditioning unit is above the ceiling. The part of the air conditioning unit above the ceiling and the part of the air conditioning unit below is configured to allow air to flow from below to above, and conditioned air to flow from above to below. In this embodiment, there is a bottom faceplate 17. Faceplate 17 provides an input aperture 19 to allow the fan 3 to draw air from below (such as a room) into the air conditioning unit, and output aperture 21 to allow conditioned air to return to below (such as a room). The input aperture 19 can be a single aperture, multiple apertures, single slot, multiple slots etc. as long as it can function to allow the fan 3 to draw air from below. Similarly, output aperture 21 can be a single aperture, multiple apertures, single slot, multiple slots, an opening surrounding the input aperture 19 etc. as long as it can function to allow conditioned air to return to below. There is an air tunnel 23, such as a pipe, which separates the input air from the output air. There is also an air tunnel 25 directing air passing through the evaporative coil 5 to exit through output aperture 21.

When installed on a vehicle, an outer shell 27 is used to protect chamber 1. While strictly not required in an indoor building installation, outer shell 27 can be included as well. Outer shell can just protect chamber 1. It can also be a shell to protect any other components related to this air conditioning unit. For example, the outer shell 27 can also include compressor, condenser unit (coil) and a fan for the condenser unit.

While not shown, louvers, filters and other common accessories can be attached to the faceplate 17, input aperture 19 and/or output aperture 21. For example, louvers can be positioned at the output aperture to direct the output air at a desired direction, desired angle or a desired air volume. Louvers can also be used to block part of the output aperture.

While not shown, faceplate 17 can include one or more sensors and a remote receiver. The one or more sensors can be used to sense conditions within the room, such as temperature or humidity, to adjust the operation of the air conditioning unit. The remote receiver can be used to receive instructions from a remote control. The remote control can communicate with the remote receiver wirelessly through any known protocol deemed suitable such as infrared, WIFI, Bluetooth etc.

In summary, the embodiment shown in FIG. 1:
a. Uses an axial fan to generate a first positive pressure zone (such as space 9), a positive pressure tunnel (indicated by one or more air flow path 11), and a second positive pressure zone (such as space 13). Air flows through these positive pressure spaces and through the evaporative unit. Because the air is forced through the evaporative unit through pressure effect (rather than through direct ejection from the fan), the air through the evaporative unit is more even and that air collision against the evaporative unit is reduced, thus reducing the noise created.
b. Exhibits difference in air pressure between the zone before the air enters the evaporative unit and the zone after the air exit the evaporative unit.
c. Includes an evaporative unit sitting on the base of the chamber. The base may be part of the chamber casing or part of the outer shell, or both. The base may include a structure to collect water, such as water condensed and dropped from the evaporative unit, and to release the collected water from the air conditioning unit.
d. Includes input aperture 19 and output aperture 21 to share a same opening on the ceiling (i.e. one single opening on the ceiling is sufficient). Examples of the opening on the ceiling are 360 mm×360 mm, 400 mm×400 mm etc. The opening can be rectangular in shape, or other shapes deemed suitable.

In the embodiment of FIG. 1, it can be seen that the chamber 1, including axial fan 3 and evaporative unit 5, is above the ceiling 15. However, it can be designed such that part of the axial fan 3 and evaporative unit 5 or both can be lowered within the inner and outer boundary of ceiling 15 or below ceiling 15.

The following are performances of an air conditioning unit following embodiment of FIG. 1 as compared to a known product of similar size and type:

|  | Embodiment of FIG. 1 | A known product |
| --- | --- | --- |
| Conditioned air volume (m³/h) | 551 | 510 |
| Noise (dB(A)) | 59 | 63 |
| Cooling capacity (W) | 2730 | 2580 |
| Input power (W) | 1380 | 1350 |

Figure 2:
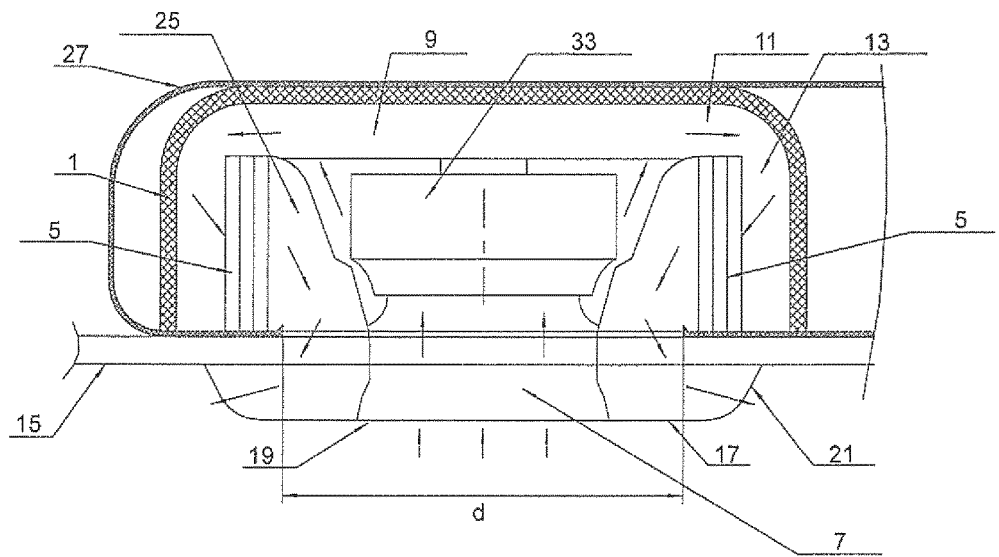
FIG. 2 depicts a variation of the embodiment of FIG. 1, in that the axial fan of FIG. 1 is replaced by a centrifugal fan.

FIG. 2 depicts another embodiment. In this embodiment, axial fan 3 of FIG. 1 has been replaced by a centrifugal fan 33. A centrifugal fan draws air through input aperture 19 and ejects the air horizontally. Due to the adjacent structure, the ejected air will be forced upwards thus creating a high pressure zone in space 9, just like the embodiment shown in FIG. 1. Other modifications and variations applicable to the embodiment of FIG. 1 can be applied to this embodiment too.

Figure 3:
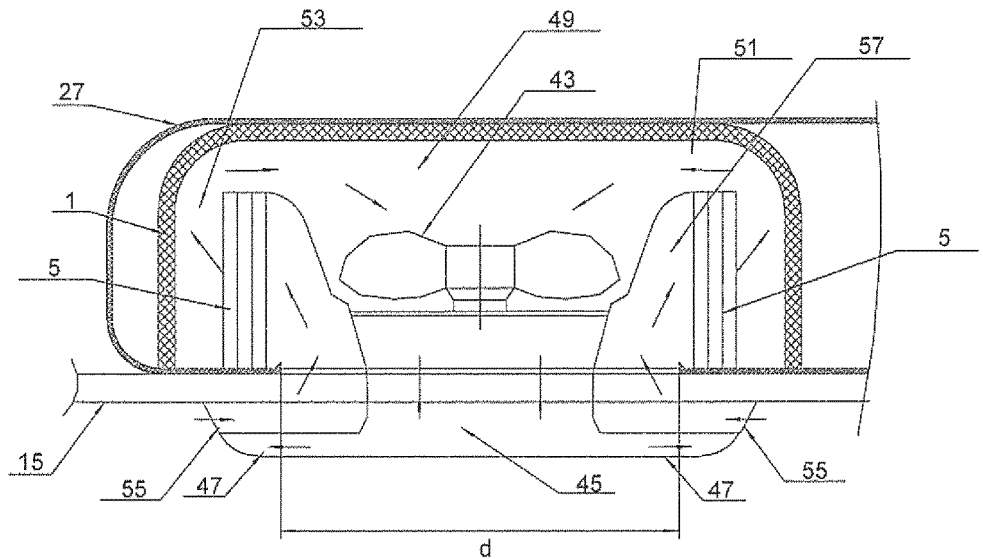
FIGS. 3 and 4 show respective alternative embodiments of those of FIGS. 1 and 2, in that the air flow direction is reversed, and that a negative pressure effect is created rather than a positive one.

FIG. 3 depicts another embodiment. With reference to the embodiment of FIG. 1, this embodiment reverses the air flow direction of the embodiment of FIG. 1. In particular, axial fan 43 now ejects conditioned air downwards through air output opening 45 before the conditioned air is released to below the ceiling through output aperture 47, thus creating a negative pressure zone in space 49. This negative pressure zone will draw air from space of one or more air flow path 51, in turn creating negative pressure zone in the space of one or more air flow path 51, and in turn creating a negative pressure zone after (based on the air flow direction) the evaporative unit 5 in space 53. This negative pressure space 53 will draw air from input aperture 55 into tunnel 57 and through evaporative unit 5.

Figure 4:
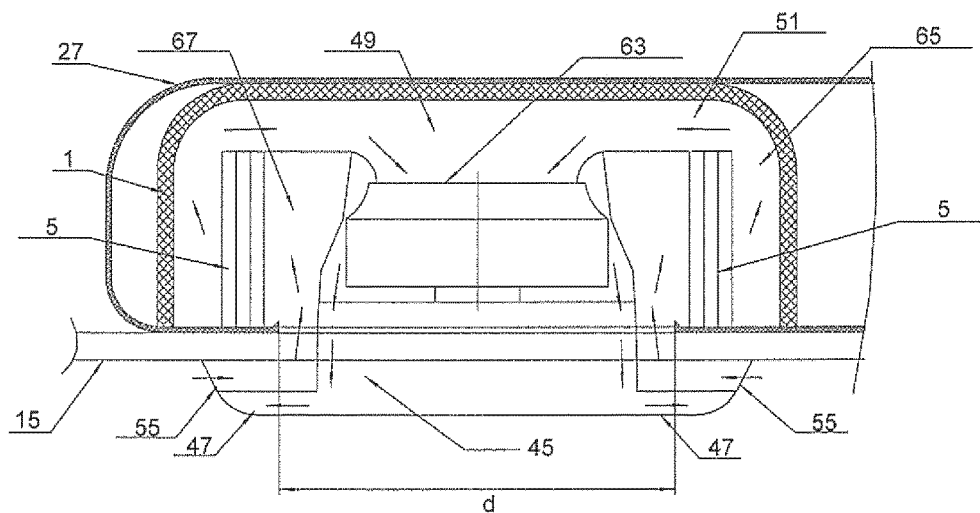
Figure 5:
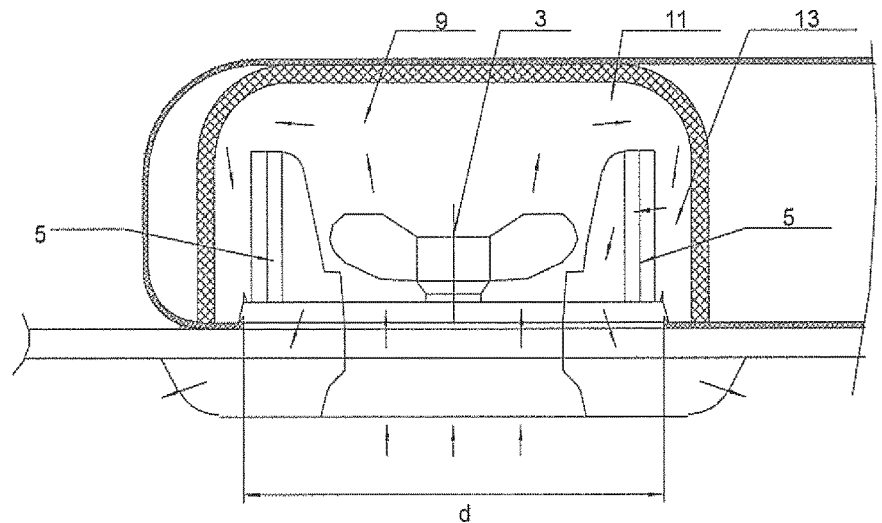
FIGS. 5 to 8 show embodiments with their evaporative units positioned on top of the opening of the ceiling, instead of being positioned adjacent to the opening of the ceiling such as those embodiments depicted in FIGS. 1 to 4.
Figure 6:
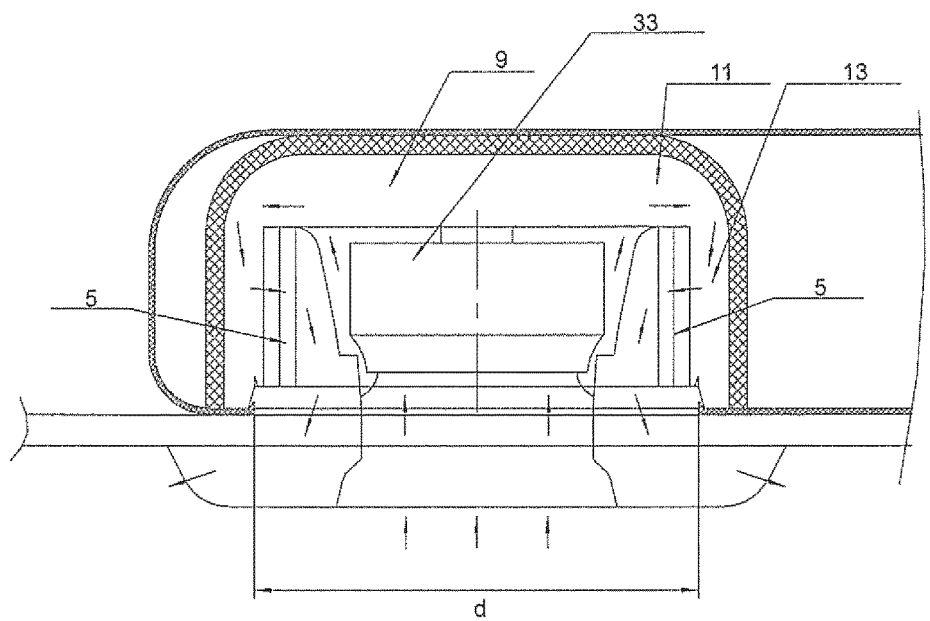
Figure 7:
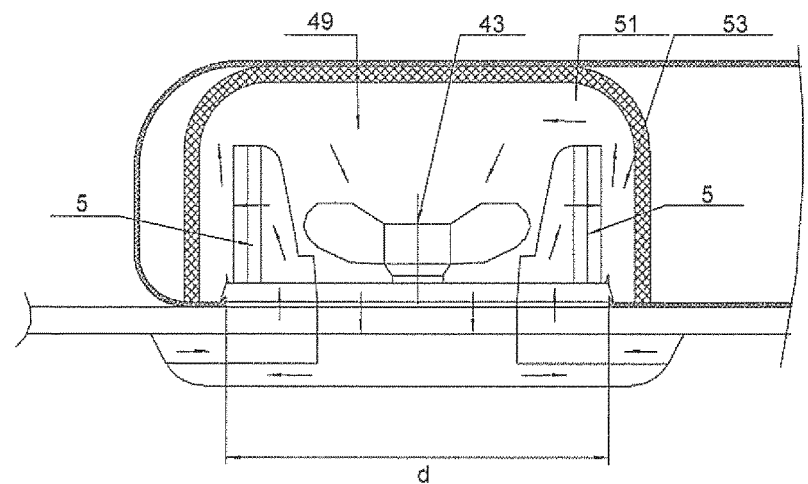
Figure 8:
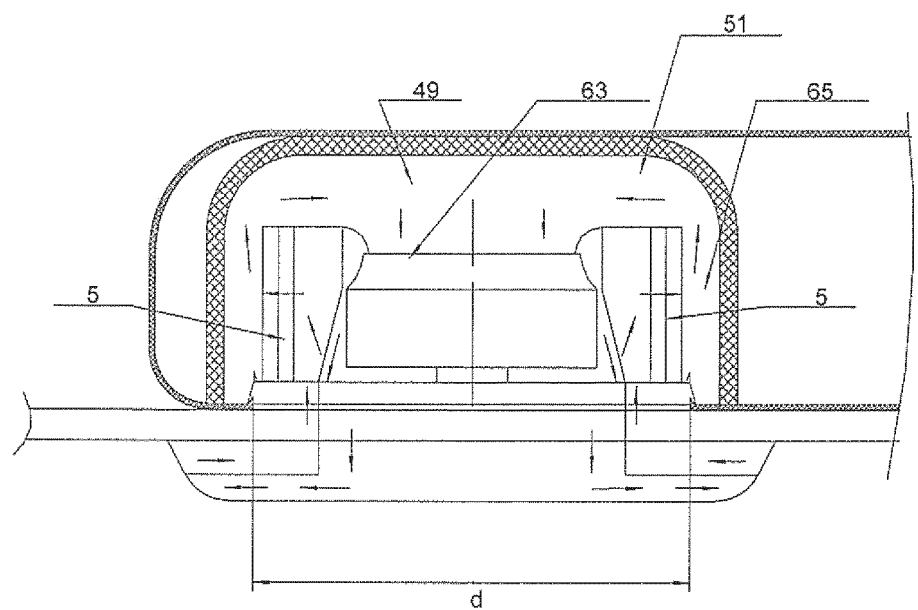

FIG. 4 depicts another embodiment. With reference to the embodiment of FIG. 2, this embodiment reverses the air flow direction of the embodiment of FIG. 2. In particular, centrifugal fan 63, together with the adjacent structure, now ejects conditioned air downwards through air output opening 45 before the conditioned air is released to below the ceiling through output aperture 47, thus creating a negative pressure zone in space 49. This negative pressure zone will draw air from the space of one or more air flow path 51, in turn creating negative pressure zone in the space of one or more air flow path 51, and in turn creating a negative pressure zone after (based on the air flow direction) the evaporative unit 5 in space 65. This negative pressure space 65 will draw air from input aperture 55 into tunnel 67 and through evaporative unit 5.

FIGS. 5 to 8 are embodiments depicting that the evaporative unit is positioned on top of the opening of the ceiling, instead of being positioned adjacent to the opening of the ceiling such as those embodiments depicted in FIGS. 1 to 4.

Figure 9:
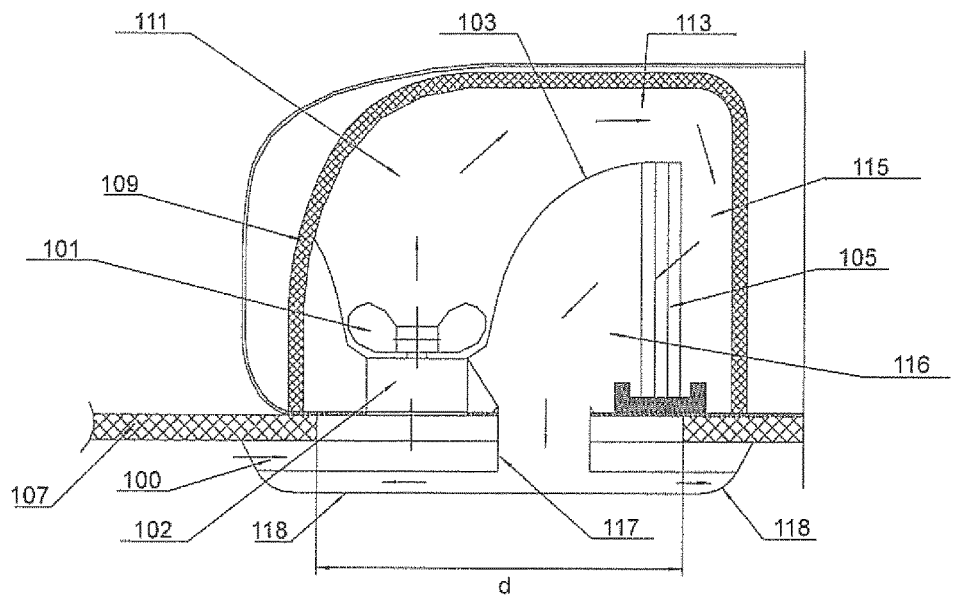
FIG. 9 shows a half or reduced version of the embodiment shown in FIG. 1.

FIG. 9 shows a half or reduced version of the embodiment shown in FIG. 1. In particular, as compared with FIG. 1, FIG. 9 essentially contains half or less than half of the evaporative unit 5 of FIG. 1. In this embodiment, in operation, axial fan 101, when powered, draws air through the air input opening 100 and tunnel 102. The air will then be ejected upwards by the axial fan 101, towards the top wall of the chamber 109. In doing so, a high pressure zone is created in space 111. The high pressure zone in space 111 then forces the air to travel through air flow path 113 to the evaporative unit 105. A zone before the evaporative unit 105 is also a high pressure zone, caused by the air travel through one or more air flow path 113 leading to the evaporative unit 105. This high pressure zone in space 115 before the evaporative coil 105 forces the air through the evaporative unit 105 before being guided by structure 116, air tunnel 117 to be released through exit aperture 118.

Figure 10:
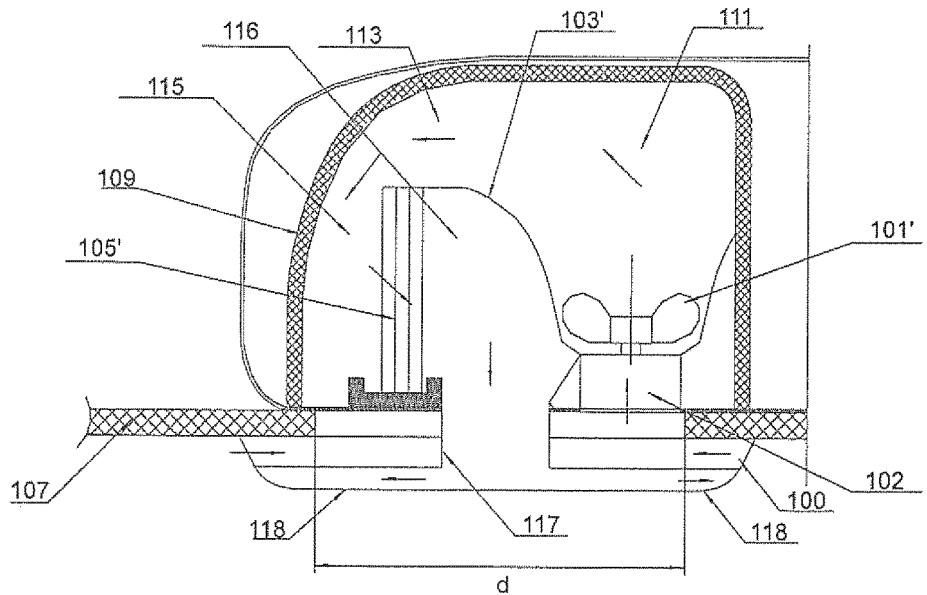
FIG. 10 shows an embodiment substantially the same with the embodiment of FIG. 9, in that the positions of the axial fan, the evaporative unit and the air tunnel are flipped left to right.

FIG. 10 shows an embodiment substantially the same with the embodiment of FIG. 9, in that the positions of the axial fan, the evaporative unit and the air tunnel are flipped left to right.

Figure 11:
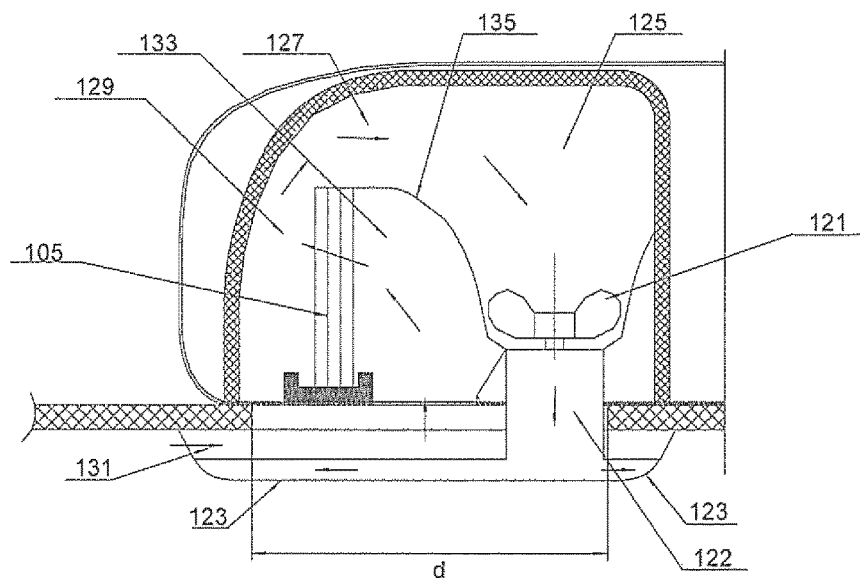
FIG. 11 shows a half or reduced version of the embodiment shown in FIG. 3.

FIG. 11 shows a half or reduced version of the embodiment shown in FIG. 3. In particular, as compared with FIG. 3, FIG. 11 essentially contains half or less than half of the evaporative unit 5 of FIG. 3. In this embodiment, in operation, axial fan 121 ejects conditioned air downwards through air tunnel 122 before the conditioned air is released to below the ceiling through output aperture 123, thus creating a negative pressure zone in space 125. This negative pressure zone will draw air from the space of air flow path 127, in turn creating negative pressure zone in the space of air flow path 127, and in turn creating a negative pressure zone after (based on the air flow direction) the evaporative unit 105 in space 129. This negative pressure space 129 will draw air from input aperture 131 into guiding structure 133 and through evaporative unit 105.

Figure 12:
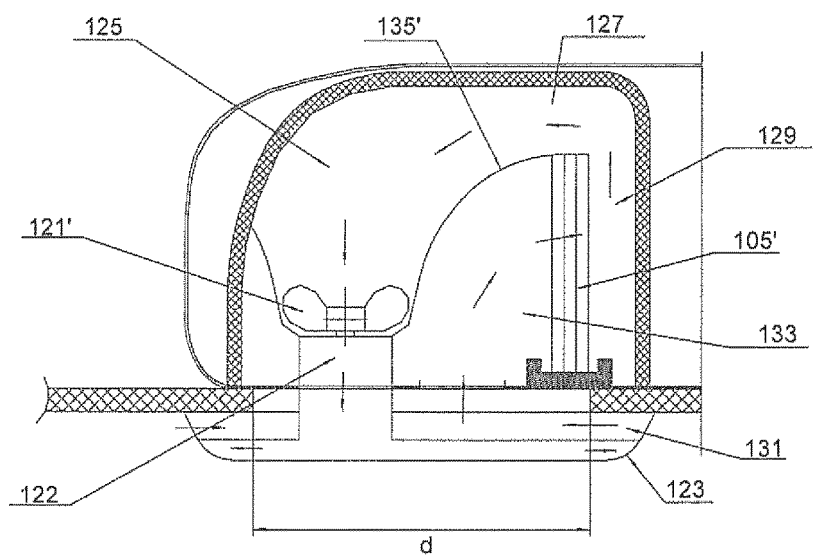
FIG. 12 shows an embodiment substantially the same with the embodiment of FIG. 11, in that the positions of the axial fan, the evaporative unit and the air tunnel are flipped left to right.
Figure 13:
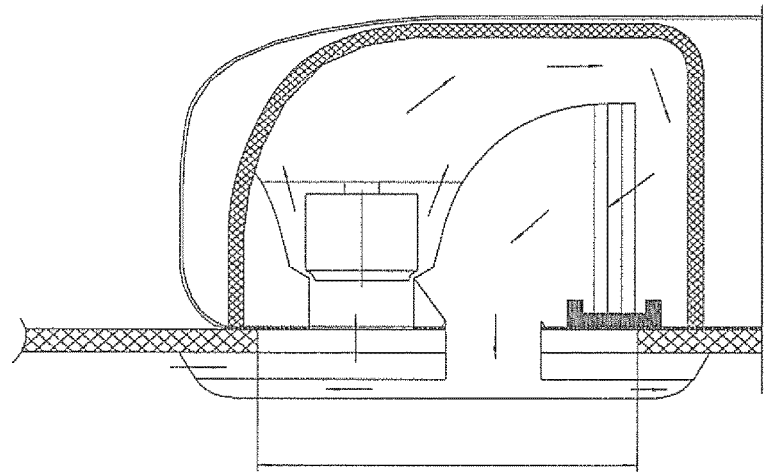
FIGS. 13 to 16 depict variations of the embodiments of FIGS. 9 to 12, in that the axial fan of FIGS. 9 to 12 are replaced by a centrifugal fan.
Figure 14:
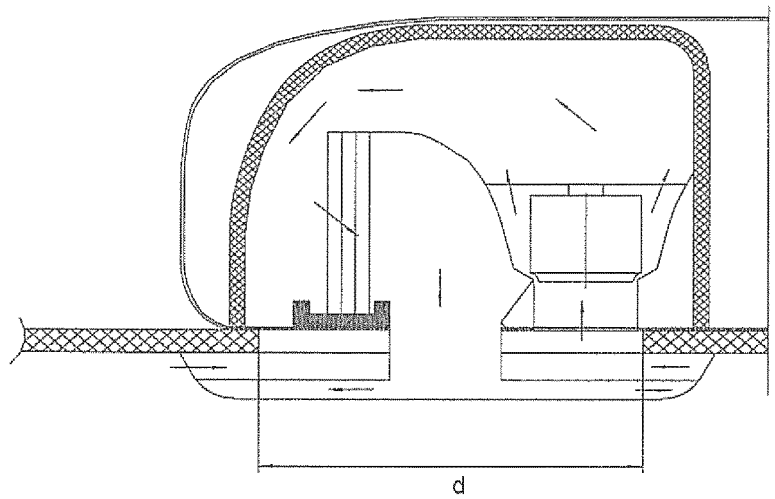
Figure 15:
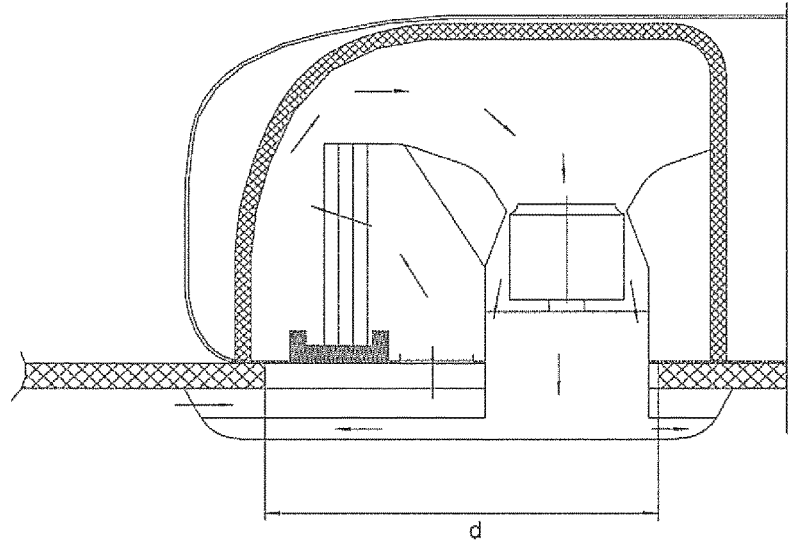
Figure 16:
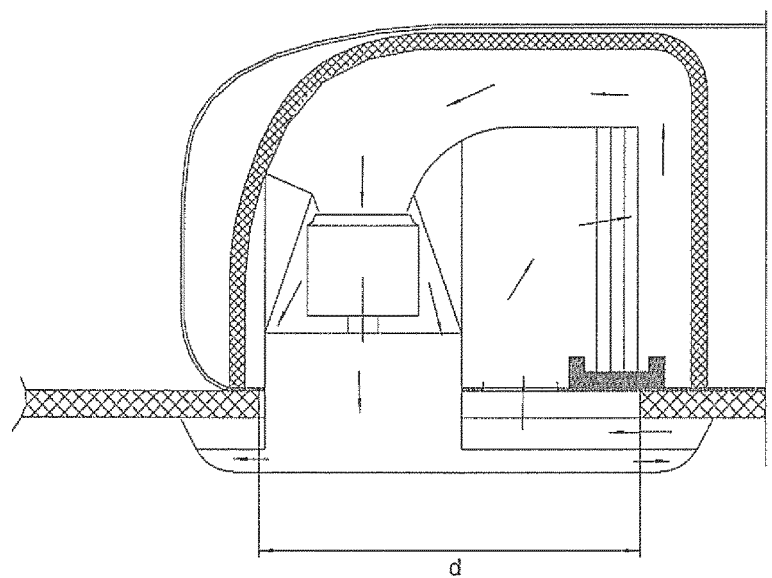

FIG. 12 shows an embodiment substantially the same with the embodiment of FIG. 11, in that the positions of the axial fan, the evaporative unit and the air tunnel are flipped left to right.

FIGS. 13 to 16 are similar to FIGS. 9 and 12 respectively, but with the axial fan replaced by a corresponding centrifugal fan.

In one form, with reference to embodiments using a centrifugal fan, the fan blades of the centrifugal fan are backwards, in the sense that the blades are angled or inclined against the rotational direction of the centrifugal fan. In certain embodiments, the blades are backward-curved.

Figure 17:
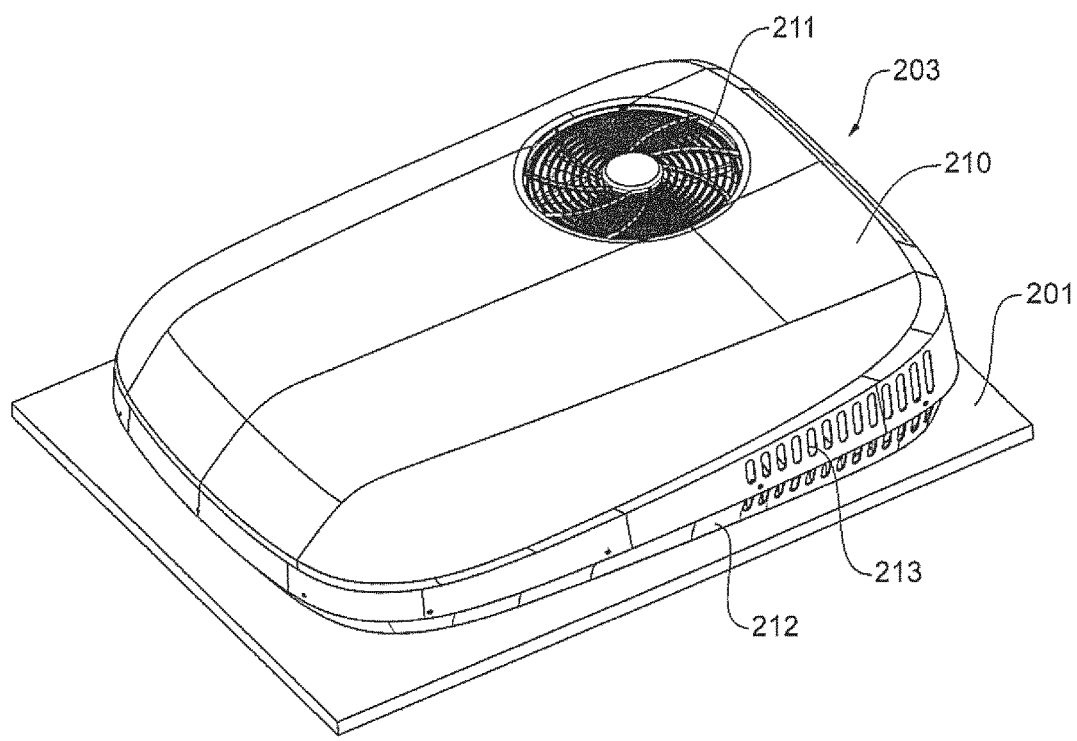
FIGS. 17 to 22 depict another embodiment of the present invention.
Figure 18:
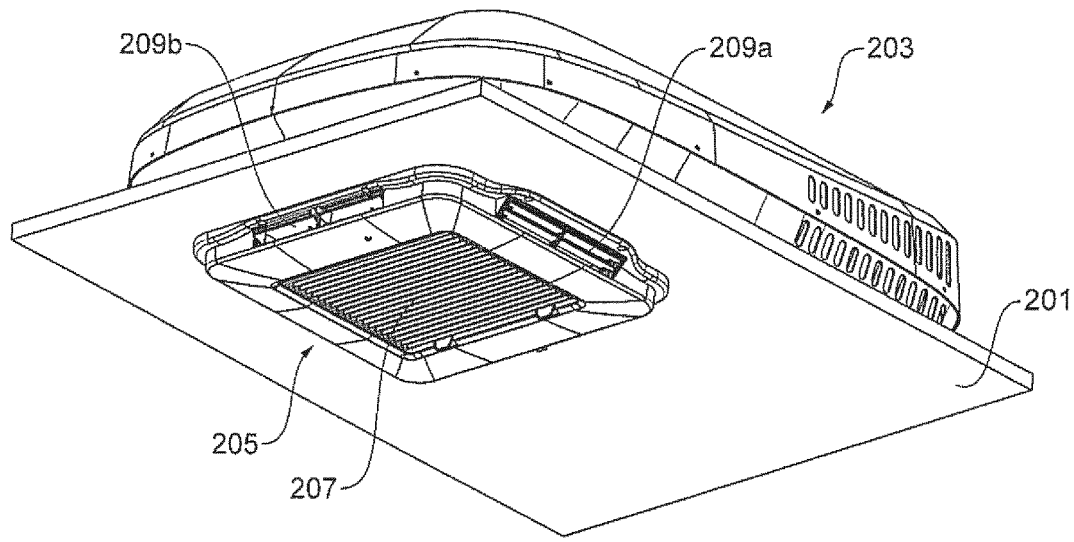
Figure 19:
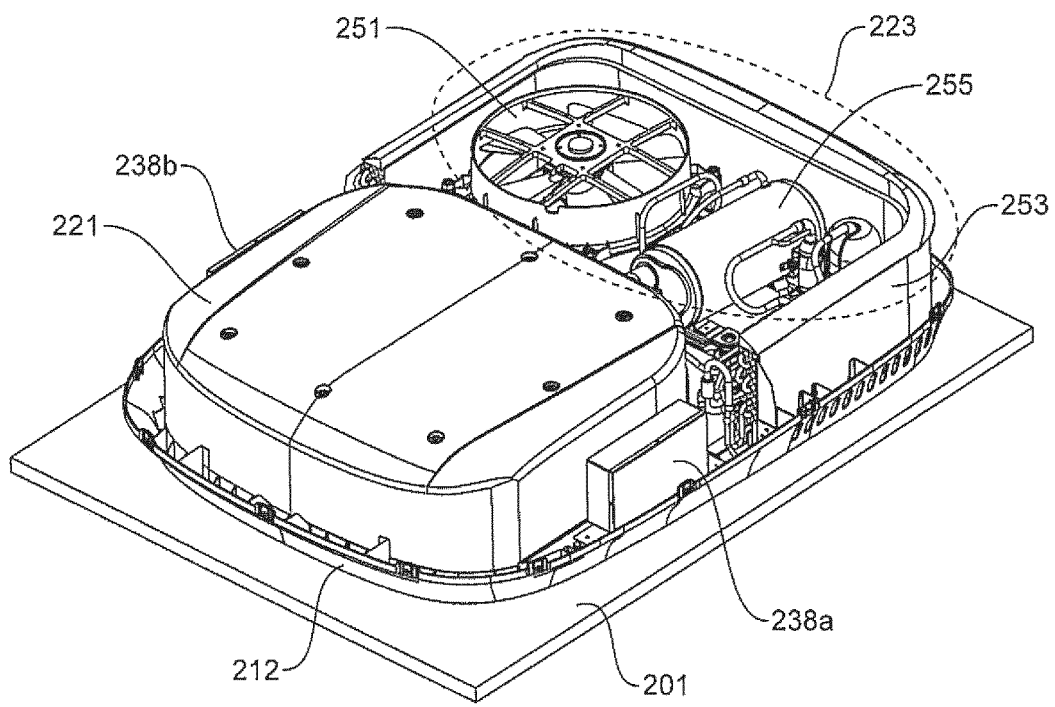

FIGS. 17 to 22 depict one embodiment of the present invention. In particular, FIG. 17 shows the top isometric view of an air conditioning unit installed on a roof. As can be seen from FIG. 17, the portion of the air conditioning unit on the roof (or outside of a room) includes an external part 203, which includes a top cover 210 and bottom cover 212. Top cover 210 is fitted to bottom cover 212. To assess the internal of the external part 203, top cover 210 can be removed. The external part 203 includes slots 213 to allow air to flow in through part of the external part (for example, the compressor/condenser part as depicted in FIG. 19 when the top cover 210 is removed). The external part 203 further includes a condenser air exit aperture 211 which allows air drawn from slots 213 to exit through condenser air exit aperture 211, once the air drawn from slots 213 has passed through condenser 253 (of FIG. 19). Of course, the compressor/condenser part can take many other forms without affecting the functionality of the evaporator part of the air conditioning unit. The choice of the top cover and bottom cover can also take many other forms. In fact, in one form, the air conditioning unit can do without the bottom cover, with the top cover fastened directly to the roof.

FIG. 18 is a corresponding bottom isometric view of the air conditioning unit of FIG. 17. This view presents the portion of the air conditioning unit below the roof (or inside of a room). In this embodiment, the portion of the air conditioning unit below the roof includes an air inlet/outlet interface 205 (sometimes known as a faceplate), where the air inlet 207 is positioned in the middle of the air inlet/outlet interface 205. There are four air outlets (209a, 209b shown in FIG. 18; 209c and 209d shown in FIGS. 21 and 22). The air inlet 207 allows air to enter the air conditioning unit for air conditioning purposes while the air outlets (209a to 209d) allow conditioned air to exit the air conditioning unit. Of course, the air inlet/outlet interface can take many other forms. For example, depending on the types of fans and the direction of air flows, the inlet and outlets can be swapped position. Also, there may be fewer or more inlet(s) and/or outlets(s). Further, the inlet(s) and outlet(s) may not form a single inlet/outlet interface (i.e. they are separated at a distance away).

FIG. 19 depicts the air conditioning unit of FIG. 17 but with the top cover 210 removed. Inside, the compressor/condenser part is indicated by 223, which includes condenser fan 251, condenser 253 and compressor 255. Note that what is shown is for illustrative purposes only and the compressor/condenser part can take many other forms. 238a and 238b are electronic boxes to control the functionality of the air conditioning unit and their forms and location can be varied. The evaporative coil (or evaporative unit or evaporator) and the evaporative fan are inside the evaporative coil cover 221. The evaporative coil cover 221 functions as a chamber so that, together with the evaporative fan, creates a pressure zone such that air moves through the evaporative unit substantially through a pressure effect without the evaporative fan ejecting air directly to, or without drawing air directly from, the evaporative unit.

Figure 20:
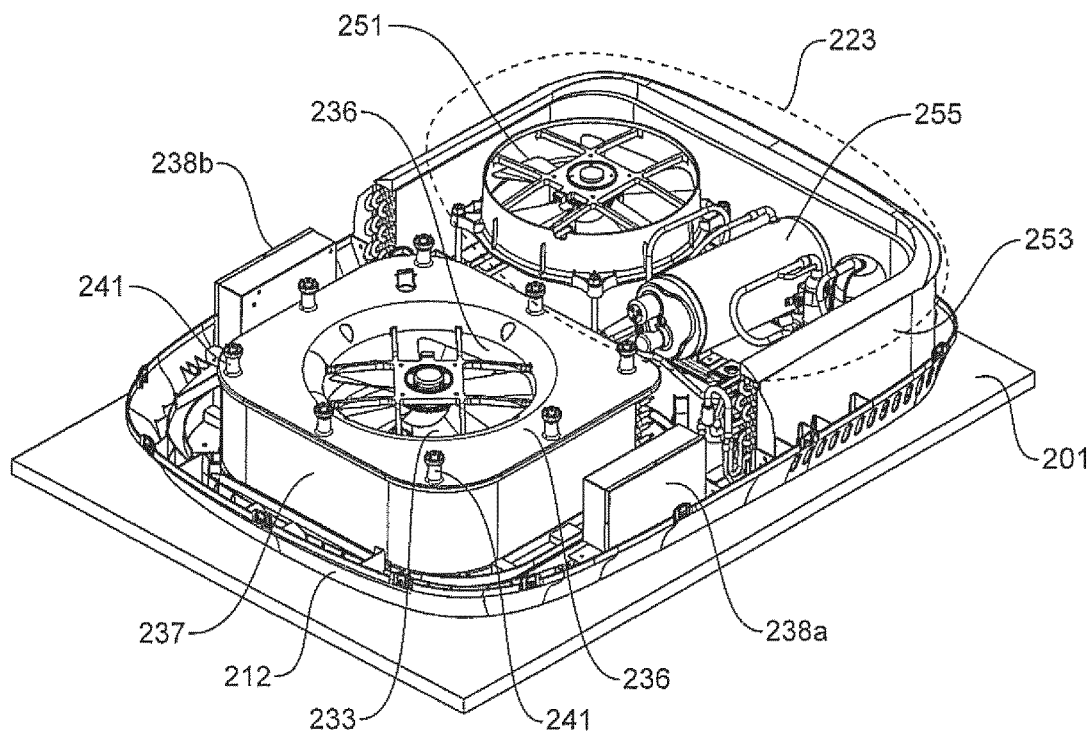

FIG. 20 depicts the air conditioning unit of FIG. 19, now with the evaporator fan cover 221 removed. The evaporator fan 233 is positioned above air inlet 207. The evaporator fan 233 is positioned in an air tunnel (or air directional bracket) 236. The air tunnel 236 sits between the evaporator fan 233 and evaporator 237. The air tunnel 236 functions to prevent the evaporative fan from ejecting air directly to, or drawing air directly from, the evaporative unit. The air tunnel 236 directs the air from the evaporator fan 223 upwards, and together with the evaporative coil cover 221 blocking the air, creates a pressure zone such that air moves towards, then through, the evaporative unit substantially through a pressure effect without the evaporative fan ejecting air directly to, or without drawing air directly from, the evaporative unit. The evaporator fan 223 in this embodiment is an axial fan. However, the same principle can be used by having a centrifugal fan with slight modifications, for example, as discussed with reference to FIGS. 2 and 4.

Figure 21:
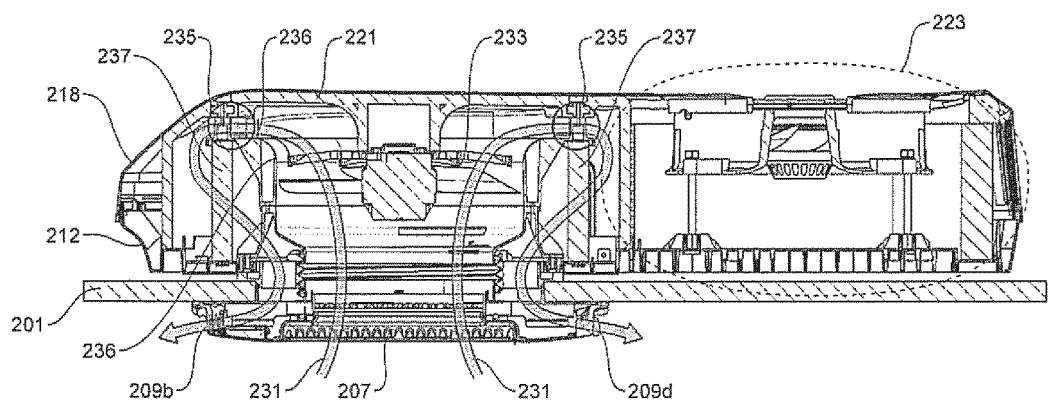

FIG. 21 illustrates the main air paths 231 through a cross sectional view of the air conditioning unit of FIG. 17. Evaporator fan 233 draws air through air inlet 207. Air tunnel 236 ensures air flowing up against the evaporator fan cover 221 thus creating a pressure zone. With the increase of pressure in the pressure zone, the air will move to a lower pressure area through openings 235. Openings 235 (as can be more clearly seen in FIGS. 20 and 22) are spaces between the upper part of air tunnel 236 and the evaporator fan cover 221. Supports 241 are provided to prevent the evaporator fan cover 221 from collapsing onto the upper part of air tunnel 236. Of course, if the evaporator fan cover 221 is made of very rigid material or if the structure is designed such that the evaporator fan cover 221 would not collapse under normal use, fewer, or even zero, supports 241 are needed. The structure between evaporator fan 233 and air outlets (for example 209b) are designed such that air flows from the high pressure zone to flow horizontally before being redirected downwards through the evaporator 237 so that the air is conditioned by the evaporator 237. The conditioned air is then directed to exit the air conditioning unit, for example, through 209b in this embodiment. The key point is that the air from the evaporator fan is not ejected directly to the evaporator or air is not drawn directly from the evaporator by the evaporator fan. This has the benefit of reducing the noise of the air conditioning unit.

The following table shows the performance of the air conditioning unit of FIG. 17 as compared to a known product:

|  | Embodiment of FIG. 17 | A known product |
|---|---|---|
| Conditioned air volume (m³/h) | 520 (high speed)<br>480 (medium speed)<br>410 (low speed) | 510 |
| Noise (dB(A)) | 56 (high speed)<br>52 (medium speed)<br>47 (low speed) | 63 |
| Cooling capacity (W) | 2749 (high speed)<br>2683 (medium speed)<br>2619 (low speed) | 2580 |
| Input power (W) | 1420 (high speed)<br>1346 (medium speed)<br>1337 (low speed) | 1350 |

As it can be seen, for a comparable performance (in fact, better), the noise is significantly lower.

Figure 22:
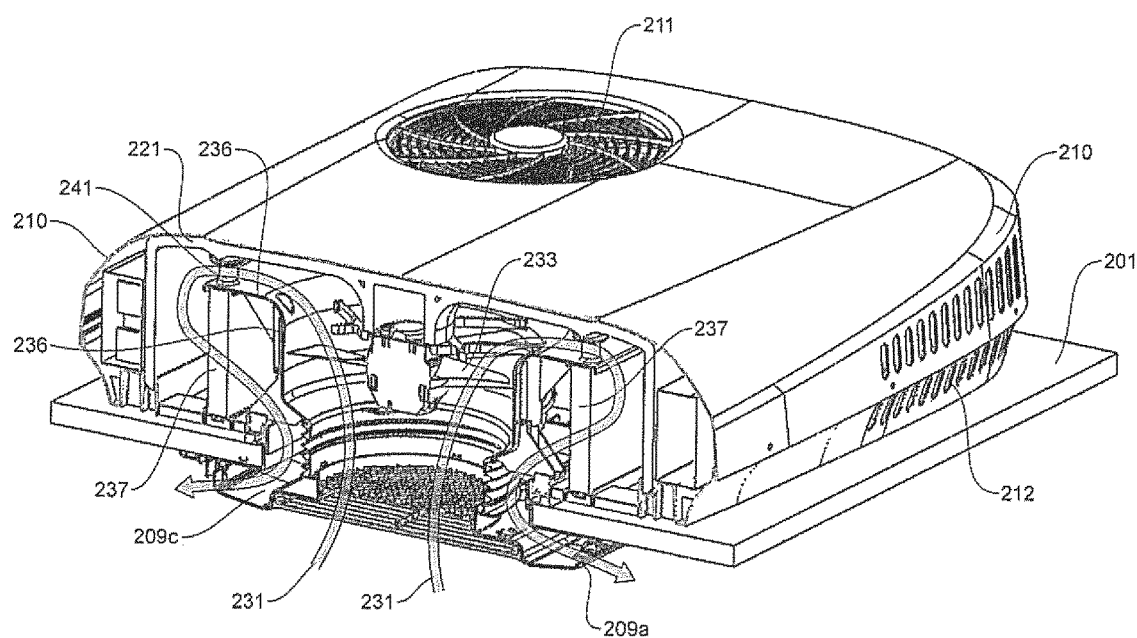

FIG. 22 depicts another cross-sectional view of the air conditioning unit of FIG. 17. This cross-section is orthogonal to the cross section of FIG. 21. As can be observed, evaporator fan 233 draws air through air inlet 207. Air tunnel 236 ensures air flowing up against the evaporator fan cover 221 thus creating a pressure zone. With the increase of pressure in the pressure zone, the air will move to a lower pressure area through openings between the upper part of air tunnel 236 and the evaporator fan cover 221. Supports 241 are provided to prevent the evaporator fan cover 221 from collapsing onto the upper part of air tunnel 236. The structure between evaporator fan 233 and air outlets (for example 209c) are designed such that air flows from the high pressure zone flow horizontally before being redirected downwards through the evaporator 237 so that the air is conditioned by the evaporator 237. The conditioned air is then directed to exit the air conditioning unit, for example, through 209c in this embodiment. Again, the air from the evaporator fan is not ejected directly to the evaporator or the air is not drawn directly from the evaporator by the evaporator fan, thus reducing the noise of the air conditioning unit.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

The invention claimed is:

1. An air conditioning unit, including:
a chamber;
a fan, in the chamber, for effecting an entry air entering the chamber and an exit air exiting the chamber; and
an evaporative unit, in the chamber, for conditioning the entry air,
wherein the fan, together with at least part of the chamber, creates a pressure zone, without ejecting air directly to, or without drawing air directly from, the evaporative unit, such that air moves through the evaporative unit substantially through a pressure effect,
wherein the air conditioning unit further includes an air tunnel, and
wherein at least a wall of the air tunnel is between the fan and the evaporative unit, and that the evaporative unit is arranged and configured such that air from the fan first flows above the evaporative unit before being redirected to the evaporative unit, or such that air drawn by the fan from the evaporative unit is redirected to flow above the evaporative unit into the air tunnel.

2. The air conditioning unit of claim 1, wherein the fan is an axial fan.

3. The air conditioning unit of claim 2, wherein the axial fan ejects air towards a wall of the chamber to create a positive pressure zone.

4. The air conditioning unit of claim 3, wherein the axial fan ejects the air upwards, then the air is guided to flow horizontally before being redirected downwards through the evaporative unit.

5. The air conditioning unit of claim 2, wherein the axial fan draws air away from a wall of the chamber to create a negative pressure zone.

6. The air conditioning unit of claim 1, wherein the fan is a centrifugal fan.

7. A vehicle with an air conditioning unit, the air conditioning unit, including:
- a chamber;
- a fan, in the chamber, for effecting an entry air entering the chamber and an exit air exiting the chamber; and
- an evaporative unit, in the chamber, for conditioning the entry air,
- wherein the fan, together with at least part of the chamber, creates a pressure zone, without ejecting air directly to, or without drawing air directly from, the evaporative unit, such that air moves through the evaporative unit substantially through a pressure effect,
- wherein the air conditioning unit further includes an air tunnel, and
- wherein at least a wall of the air tunnel is between the fan and the evaporative unit, and that the evaporative unit is arranged and configured such that air from the fan first flows above the evaporative unit before being redirected to the evaporative unit, or such that air drawn by the fan from the evaporative unit is redirected to flow above the evaporative unit into the air tunnel.

8. The vehicle of claim 7, wherein the fan is an axial fan.

9. The vehicle of claim 8, wherein the axial fan ejects air towards a wall of the chamber to create a positive pressure zone.

10. The vehicle of claim 9, wherein the axial fan ejects the air upwards, then the air is guided to flow horizontally before being redirected downwards through the evaporative unit.

11. The vehicle of claim 8, wherein the axial fan draws air away from a wall of the chamber to create a negative pressure zone.

12. The vehicle of claim 7, wherein the fan is a centrifugal fan.

* * * * *

UNITED STATES PATENT AND TRADEMARK OFFICE
CERTIFICATE OF CORRECTION

PATENT NO. : 11,364,772 B2
APPLICATION NO. : 16/494638
DATED : June 21, 2022
INVENTOR(S) : Shihong Bei and Jianguo Zhu It is certified that error appears in the above-identified patent and that said Letters Patent is hereby corrected as shown below:

In the Specification

Column 2, Line 56, --shape.-- should be --shape,--

Signed and Sealed this
Twenty-first Day of March, 2023

Katherine Kelly Vidal
*Director of the United States Patent and Trademark Office*